Dec. 20, 1927.  
W. PLUMB  
1,653,371  
SEALED METAL CONTAINER  
Filed Dec. 22, 1926
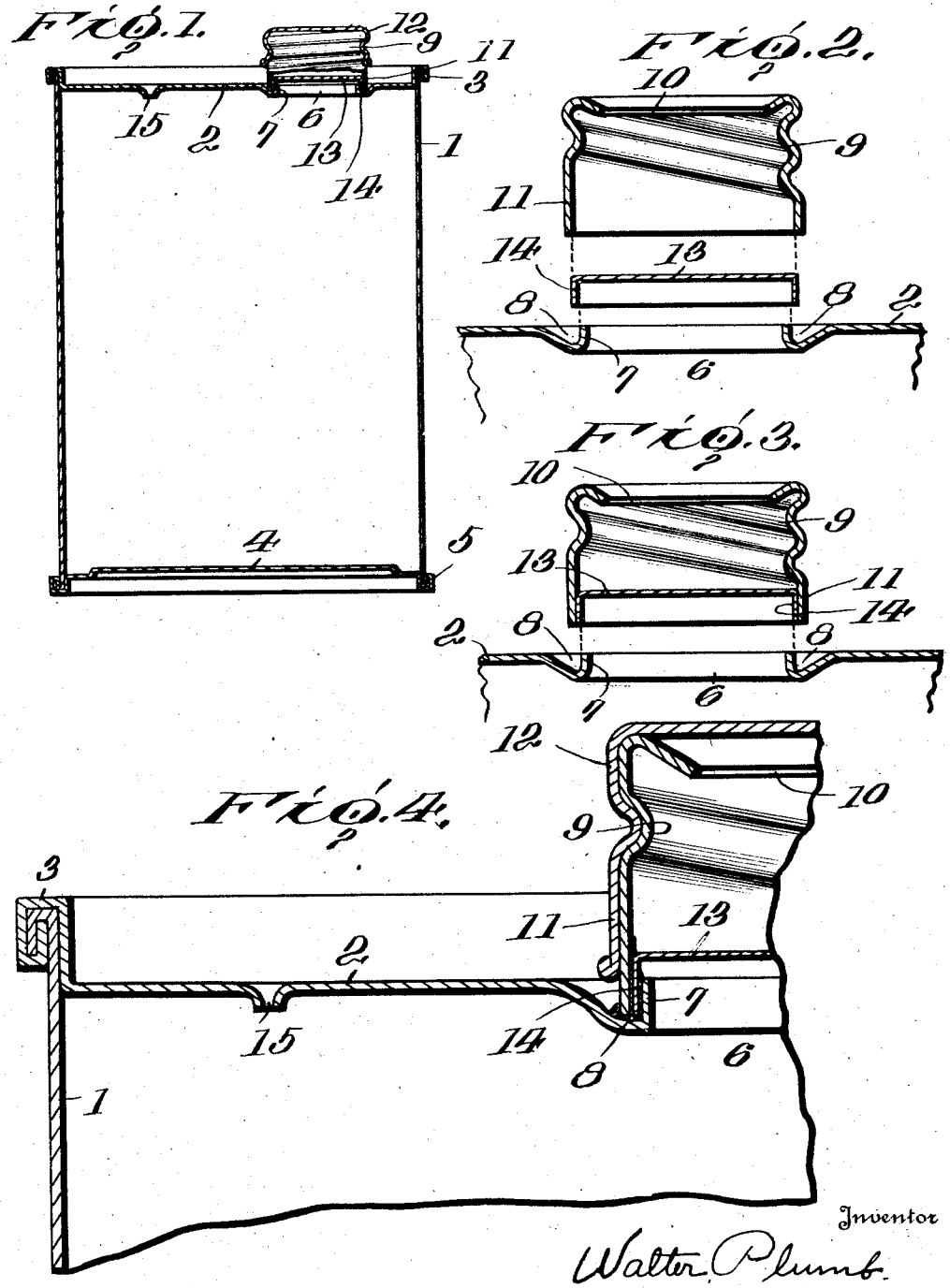

Patented Dec. 20, 1927.

1,653,371

UNITED STATES PATENT OFFICE.

WALTER PLUMB, OF GLEN ROCK, NEW JERSEY, ASSIGNOR TO CONTINENTAL CAN COMPANY, INC., OF NEW YORK, N. Y., A CORPORATION OF NEW YORK.

SEALED METAL CONTAINER.

Application filed December 22, 1926. Serial No. 156,360.

The invention relates to new and useful improvements in sealed metal containers having a nozzle.

An object of the invention is to provide a metal container having a nozzle and a metal sealing disk soldered to the end of the container, wherein the sealing disk and the nozzle may be assembled prior to the soldering of the same to the end in such a way that the sealing disk is frictionally held in the nozzle in the desired position for the simultaneous soldering of the nozzle and sealing disk to the container end.

A further object of the invention is to provide a construction of the above type wherein the lower portion of the nozzle and the flange on the sealing disk are cylindrical and of uniform diameter and are adapted to fit over the cylindrical lip on the end of the container so that when solder is applied it will be sweated in between the contacting walls of the lip, the disk and the nozzle.

These and other objects will in part be obvious and will in part be hereinafter more fully disclosed.

In the drawings which show by way of illustration one embodiment of the invention—

Figure 1 is a sectional view through a metal container embodying the improvements;

Fig. 2 is a sectional view showing a portion of the end, the disk and the nozzle, prior to the assembling or joining of the same;

Fig. 3 is a similar view, but showing the nozzle and disk assembled, and ready to be attached to the end, and Fig. 4 is a similar view, but showing the parts assembled on the end and joined by soldering.

The invention is directed broadly to a sealed metal container having a nozzle. Prior to this invention, it has been customary to use a sealing disk of tagger's tin, and to solder the tagger's tin and nozzle to the container body so that the package is hermetically sealed, and the opening of the package is accomplished by the breaking of the seal of tagger's tin. The present invention is directed to a container of the above type, and has to do with the construction of the sealing disk. The nozzle is of the usual construction and is without any flange at its lower end, so that the lower end portion of the nozzle is cylindrical and of uniform diameter. The sealing disk is made of tagger's tin, and is made hat-shaped, so as to provide a cylindrical flange, and this cylindrical flange is of uniform diameter, and also its external diameter is normally greater than the internal diameter of the nozzle. The purpose of this sizing of the parts is to enable the sealing disk and nozzle to be assembled and handled as a unit in the attaching of these parts to the end of the container. The container end is provided with an aperture which is surrounded by a lip, and this lip is likewise cylindrical at its upper portion and of substantially uniform diameter. The lip is adapted to fit within the sealing disk, and then the parts are all joined by soldering.

Referring more in detail to the drawings, the improved container consists of a body portion 1 which may be of any desired cross sectional shape. The upper end 2 is secured to the container body by a double seam 3. The lower end 4 is secured to the container body by a double seam 5. The upper end 2 is provided with an aperture 6. Surrounding the aperture 6 is an upturned lip 7 which is cylindrical and of substantially uniform diameter at its extreme upper edge portion. Surrounding this lip is the usual annular groove 8. The nozzle 9 is of the usual construction and is provided with an open upper end 10 and with a lower cylindrical portion 11 which is of substantially uniform diameter. This nozzle may be provided with a thread or with lugs, or with any suitable means for attaching the cap 12 thereto.

A sealing disk 13 of tagger's tin is provided. This sealing disk 13 is made hat-shaped, so as to provide a cylindrical flange 14. The cylindrical flange 14 is of uniform diameter, and the external diameter of this flange is normally greater than the internal diameter of the lower portion 11 of the nozzle. This sealing disk is placed on a plunger of substantially the same diameter as the inner portion of the sealing disk, and then the nozzle is forced down over the plunger and sealing disk. The plunger sustains the sealing disk which is of thin light tagger's tin, and causes the lower cylindrical portion of the nozzle to expand to receive the sealing disk. The sealing disk is forced into the nozzle until the lower edge of its flange is substantially coincident with the lower edge of the nozzle. Thus it is that the sealing disk and nozzle are assembled so that they are frictionally gripped one to the other and may be handled as a single unit. The sealing disk is of such proportion as to fit snugly around the lip on the end of the container. The assembled disk and nozzle are placed about this lip, and then solder is applied for securing the parts together. The solder will sweat in between the contacting faces of the sealing disk and the lip of the container end, and also in between the contacting faces of the sealing disk and the lower edge portion of the nozzle. It is understood, of course, that these parts are heated so as to bring about this sweating in of the solder. As a matter of fact, the solder will flow up along the inside wall of the nozzle to a point above the sealing disk. Very little solder is required, and any surplus solder will accumulate in the annular groove and embed the lower raw edges of the metal forming the sealing disk and forming the nozzle. The groove does not need to be filled with solder. In fact, only enough solder is necessary to secure these contacting walls, and therefore, when a package is made embodying these improvements, it is a very neat and attractive package.

It is very desirable in packaging volatile products, and particularly explosive products, to use a sealing disk for hermetically closing the package, so as to prevent loss of the product by evaporization. It is also impracticable to fill the package with an explosive product and then solder the nozzle and disk to the container body.

In order to fill the container, particularly when explosives are to be stored therein, the nozzle with the sealing disk is applied before the container is filled, after which the container may be filled through an opening 15, and this opening sealed in a suitable way. Other ways may be used for filling and closing the receptacle, and for certain products, the sealing disk and nozzle may be soldered to the receptacle after it is filled, if desired.

Having thus described the invention, what I claim as new and desire to secure by Letters Patent, is:—

1. A sealed metal container comprising a body portion, an end secured thereto, said end having an aperture, a nozzle adapted to surround said aperture, a sealing disk having a cylindrical depending flange of uniform diameter and normally of greater external diameter than the internal diameter of the nozzle, forced into the nozzle, and frictionally held therein, and solder securing said disk to said nozzle, and the disk and nozzle to the end of the container.

2. A sealed metal container comprising a body portion, an end secured thereto, said end having an aperture and a raised lip surrounding said aperture, a nozzle having its lower edge portion of uniform diameter, a sealing disk having a cylindrical depending flange of uniform diameter and normally of greater external diameter than the internal diameter of the nozzle forced into the nozzle and frictionally held therein, said disk fitting closely over said lip, and solder extending between the contacting walls of said lip and disk and nozzle.

In testimony whereof, I affix my signature.

WALTER PLUMB